United States Patent Office 3,523,072
Patented Aug. 4, 1970

3,523,072
ISOMERIZATION OF PARAFFINS
Abraham Schneider, Philadelphia, Pa., assignor to Sun Oil Company, Philadelphia, Pa., a corporation of New Jersey
No Drawing. Filed Dec. 24, 1968, Ser. No. 786,739
Int. Cl. C07c 5/28
U.S. Cl. 208—27                                                        8 Claims

ABSTRACT OF THE DISCLOSURE

Straight and branched chain paraffins having at least seven carbon atoms, and particularly higher molecular weight waxes, are converted into branched or more highly branched chain paraffins by contacting the starting materials with aluminum chloride in the presence of inert halogenated hydrocarbon solvents under conditions whereby conversion is limited to not more than a certain percentage per pass depending on the nature of the hydrocarbon in order to avoid cracking. The reaction should be carried out in the substantial absence of those organic compounds which form complexes with the aluminum chloride.

BACKGROUND OF THE INVENTION

This invention relates to a method for the isomerization of paraffins, and more specifically, to an improved method for the conversion of straight and branched chain paraffins to branched and more highly branched chain paraffins respectively, wherein aluminum chloride is employed as the isomerization catalyst.

Prior art processes for the isomerization of paraffins wherein aluminum chloride is employed as the catalyst are often characterized by the presence of one or more drawbacks such as low yields, decomposition of solvent, the need for including complex-forming substances to react with the aluminum chloride, or the like. U.S. Pat. 2,361,452, for example, which is directed to the isomerization of $C_4$ to $C_8$ paraffins, requires the presence of large amounts of alkyl halide solvents which are known to readily decompose in the presence of aluminum chloride to form hydrogen halide and olefins. This side reaction, which is recognized by the patent to be present, is objectionable not only because of the loss of substantial amounts of solvent, but also because the formed olefins then react with the aluminum chloride to form complex sludges which interfere with the catalytic activity of the aluminum chloride.

In U.S. Pat. 2,475,358 which is directed particularly to the isomerization of waxes, complexes of specified organic compounds with aluminum chloride are formed by patentees as a means of overcoming the problem of cracking which is inherently present in the isomerization of higher molecular weight paraffins by aluminum chloride. Such complexes are advantageous in helping to suppress cracking presumably because they slow down the action of the aluminum chloride in this respect. Unfortunately, they likewise detract from the ability of the aluminum chloride to isomerize as well, since the percentage conversion per pass in accordance with this process does not exceed about 40 percent. Moreover, unlike the earlier method, this process requires the added presence of a modifying agent used to form the complex with the aluminum chloride.

SUMMARY OF THE INVENTION

It has now been found, in accordance with the present invention, that each of the foregoing difficulties may be avoided, and paraffins readily converted to their branched chain isomers in high yield and with little or any cracking, by contacting those paraffins having at least seven carbon atoms with aluminum chloride in the presence of an inert halogenated hydrocarbon, and in the substantial absence of any material which will tend to form a complex with the aluminum chloride, under controlled reaction conditions whereby the weight percent of starting material converted per pass is limited to within a certain range depending upon the nature of the starting material, in order to avoid cracking.

This improved method is particularly applicable to the isomerization of paraffin waxes having from seventeen to one hundred carbon atoms to form highly pure lubricating oils having low pour points and high viscosity indexes.

DESCRIPTION OF THE PREFERRED EMBODIMENTS

As aforestated, this process is applicable to the isomerization of straight and branched chain paraffins to form branched and more highly branched isomers thereof, respectively. As also stated above, this process is of particular applicability to those paraffin waxes having from about seventeen to one hundred carbon atoms, including paraffin wax per se, slack wax, which by definition contains small amounts of lubricating oils admixed within it, and wax filtrates, otherwise known as cerols, which contain naphthenic hydrocarbons having at least 18 carbon atoms along with relatively high melting, branched paraffin hydrocarbons.

When the aforementioned starting materials are treated in accordance with the process of this invention there are obtained branched or more highly branched chain isomers thereof having the same molecular weight as the starting material. In the case of the paraffin waxes, including slack wax and wax filtrates, there are obtained high quality lubricating oils which possess both a high viscosity index and low pour point. Moreover, the properties of the lubricating oils already admixed with the slack wax are themselves improved by this process. Highly purified waxes are also recovered as additional products of this novel method.

Before contacting the paraffin starting material with the aluminum chloride catalyst, it is important that it be purified to the extent of first substantially removing therefrom all compounds which will complex with the aluminum chloride to form a coating or sludge that will interfere with its activity and reduce its ability to isomerize the paraffins. Chief amongst the impurities which tend to poison the catalyst are all aromatic compounds. These may conveniently be separated from the paraffins by conventional acid treatment or the like. Hydrogenation to complete saturation is another way to render the aromatics harmless to the catalyst. The presence of olefins, carboxylic acids, alcohols, ketones, ethers, acid halides and the like should likewise be avoided, and if necessary removed from the paraffin mixture by any conventional techniques prior to isomerization.

In carrying out this process, it has been found to be essential that the halogenated hydrocarbon solvent for the aluminum chloride catalyst be inert to the reactants and reaction conditions employed. As mentioned heretofore, such materials as ethyl chloride, propyl chloride, butyl chloride or the like must be avoided since they are decomposed by aluminum chloride to form by-products which polymerize to form sludges that coat and deactivate the catalyst. Amongst the inert halogenated hydrocarbons which are satisfactory in this process are included methylene chloride and symmetrical tetrachloroethane, and preferably the former compound. The solvent may be present in from 1 to 200 parts by weight based on the weight of the catalyst, and preferably from 10 to 50 parts by weight. Amounts in excess of these ranges are generally desirable when a cracking suppressor is also employed, inasmuch as the presence of such compounds is found to decrease the solubility of catalyst complex formed by cracking of the hydrocarbon in the solution. This is also true when low temperatures are used, in which case excess solvent is necessary to overcome the decreased solubility of the aluminum chloride at these low temperatures.

Aluminum chloride is known to cause the cracking of paraffins such as heptane and higher paraffins, particularly the solid paraffins having at least seventeen carbon atoms. Therefore, as a further aspect of the process of this invention, it has been found necessary to limit the percentage conversion of starting material per pass to a range of from about 25 to 65 percent by weight of the paraffin starting material, depending upon the molecular weight of the hydrocarbon to be isomerized. Thus, as a general rule, it has been found that the following optimum limits of conversion per pass are necessary in order to avoid cracking: for $C_7$ paraffins, 80 percent conversion limit per pass; for $C_8$ to $C_{12}$ paraffins, 25 percent limit per pass; for $C_{13}$ to $C_{18}$ paraffins, 45 percent limit per pass; and for $C_{19}$ to $C_{100}$ paraffins, 65 percent limit per pass. While it is possible to operate below these ranges, it is not economically desirable to do so; above these given ranges substantial cracking starts to take place.

The conversion rate can be conveniently achieved by controlling the reaction conditions, especially time and temperature, in order to stay within these ranges. Thus, it has been found that by carrying out the isomerization within a temperature range of from about 0 to 50° C., and preferably from 10 to 35° C., a suitable time period can then be routinely selected in order to maintain the desired weight percent conversion. Generally, a period of from about 5 minutes to 5 hours, depending upon the temperature and the nature of the paraffin starting material, has been found to be suitable.

As a further means of controlling cracking, it is preferred that a cracking inhibitor be used in conjunction with the controlled reaction conditions in order to obtain uniformly a product whose molecular weight will be the same as that of the starting material. Suitable cracking suppressors comprise any material capable of suppressing cracking in the presence of aluminum chloride catalyst under the reaction conditions of this process. Thus, such materials as cycloparaffins or alkyl-substituted cycloparaffins, as for example ethylcyclohexane; binuclear alicyclic hydrocarbons such as decahydronaphthalene; or saturated bridged hydrocarbons and the like have been found to be effective. Amongst these methylcyclohexane is preferred. Other cracking suppressors which may likewise be employed are set forth in more detail in column 4 of U.S. Pat. No. 2,475,358, with the exception of methylcyclopentane and cyclohexane, which have been found to slow the rate of isomerization under the conditions of this process. Nevertheless, methylcyclopentane and/or cyclohexane may be used where it is desirable to achieve maximum conversion at highest selectivity. The cracking suppressors should be maintained in the reactor in amounts of from one quarter part to 20 parts by weight per part of the hydrocarbon to be isomerized, and preferably from 1 to 50 parts by weight.

The isomerization catalyst is, as mentioned above, preferably aluminum chloride. While aluminum bromide or other like Friedel-Craft type catalysts may be used, they are generally undesirable because of differences in solubility, difficulty of recovery and the like. The aluminum chloride catalyst is desirably used in amounts of from 0.5 to 100 weight percent based on the weight of the charged paraffin, and preferably from 1 to 2 percent by weight. The catalyst may conveniently be added to the paraffin-solvent mixture in the form of a powder, and recovered in the same form by filtration. This recovered material can readily be rendered a free-flowing colorless, active powder again, even if it is contaminated with complex, by simply washing it with methylene chloride.

The reaction should preferably be carried out in the presence of an added catalyst activator, generally a hydrogen halide such as hydrogen chloride. The amount employed may vary from as little as one one-hundredth the amount necessary to saturate the reaction mixture at atmospheric pressure up to about 10 to 20 atmospheres of hydrogen chloride in excess of what would be soluble in the reaction solution. Moisture need not be completely excluded from this reaction. Actually, small amounts of moisture, amounting to a few parts per million of the hydrocarbon feed added continuously in the feed throughout the reaction is highly beneficial with regard to enhancement of the rate of isomerization.

The desired lubricating oils may conveniently be recovered from the reaction mixture and reagents by first filtering off the aluminum chloride powder, followed by the stripping off of the solvent and cracking suppressor which, in the case of a continuous process, may be recycled to the reactor. The remaining filtrate may then be distilled to yield a mixture of branched paraffins and unreacted paraffins. By conventional dewaxing procedures an isomerized product of improved properties is then recovered as well as unreacted paraffins which may then be recycled to the reactor. In those cases where slack wax and wax filtrates are employed as the charge stock, removal of the desired lubricating oil generally yields a residue of a highly pure crystalline wax as an additional product.

EXAMPLE 1

A mixture of cis and trans Decalin (approximately 60/40 by weight) to be used as a cracking inhibitor in a subsequent isomerization of 3-methylheptane was equilibrated by shaking the following mixture at ambient temperature for 62 minutes after saturation with dry hydrogen chloride at atmospheric pressure:

|  | G. |
|---|---|
| $Cl_2HC$—$CHCl_2$ | 32.3 |
| Decalins | 4.6 |
| $AlCl_3$ | 1.1 |

Analysis of a portion of the washed and dried product by gas liquid phase chromotography (GLPC) showed equilibrium had been achieved clearly and selectively, the Decalins in the product consisting of 1.2 weight percent of cis and 98.8 percent trans Decalin.

To the remainder of the reaction mixture at this point was added 3.6 g. of 3-methylheptane and the shaking continued at the conditions and times designated in the following table. Again, the course of the reaction was monitored by sampling, washing, drying and analysis of the organic product by GLPC. In this table, the concentration of tetrachloroethane has been factored out, but the concentration of the solvent remained essentially unchanged during the reaction.

TABLE 1

| | Cumulative reaction time, minutes | | | | | |
|---|---|---|---|---|---|---|
| | 65 | 195 | 280 | 340 | 460 | 635 |
| | Temperature, °C. | | | | | |
| | 0 | 0 | 0 | 10 | 10 | 10 |
| Product Composition, area percent: | | | | | | |
| Isobutane | Trace | 0.05 | 0.05 | 0.09 | 0.4 | 0.9 |
| Isopentane | Trace | Trace | Trace | 0.05 | 0.09 | 0.2 |
| Hexanes | | Trace | Trace | 0.05 | 0.09 | 0.2 |
| Heptanes | | | | | 0.09 | 0.2 |
| 2,4- and 2,5-dimethylhexane | 1.5 | 2.9 | 3.5 | 4.8 | 7.4 | 10.6 |
| 2-, 2- and 4-methylheptane | 47.8 | 47.7 | 44.8 | 44.3 | 31.6 | 39.1 |
| Trans Decalin | 50.1 | 48.8 | 51.0 | 50.0 | 49.5 | 48.1 |
| Cis Decalin | 0.6 | 0.5 | 0.6 | 0.7 | 0.8 | 0.7 |

The above table shows that even at relatively low temperatures there is obtained about a 21 percent by weight conversion of the singly-branched starting material to the more highly-branched dimethylhexanes with virtually no change in the composition of the solvent, and with very little attendant cracking, even after 10 hours.

EXAMPLE 2

The general procedures of Example 1 were repeated, except that dimethylcyclohexane was substituted for Decalin as the cracking inhibitor, and the temperature was raised as noted below.

At 28.5° C. the following mixture was shaken after saturation with dry hydrogen chloride and sampled and analyzed by GLPC at the indicated reaction times:

| | G. |
|---|---|
| 3-methylheptane | 3.63 |
| Mixed cis and trans 1,4-dimethylcyclohexane | 4.01 |
| Methylene chloride ($CH_2Cl_2$) | 13.24 |
| $AlCl_3$ powder | 0.86 |

TABLE 2

| Cumulative reaction time, minuites | 60 | 120 |
|---|---|---|
| Product composition, area percent:[1] | | |
| Isobutane | 0.3 | 1.2 |
| $C_5$ to $C_7$ paraffins | 0.06 | 0.2 |
| 2,4- and 2,5-dimethylhexanes | 5.3 | 10.5 |
| 2-, 3- and 4-methylheptanes | 38.7 | 33.0 |
| Low-boiling dimethylcyclohexanes[2] | 47.2 | 47.3 |
| High-boiling dimethylcyclohexanes[3] | 7.6 | 6.9 |
| Ethylcyclohexane | 0.9 | 0.9 |

[1] Concentration of methylene chloride factored out.
[2] Includes 1,1-, cis 1,3- and trans 1,4-dimethylcyclohexanes.
[3] Includes cis and trans 1,2-, trans 1,3- and cis 1,4-dimethylcycolhexanes.

EXAMPLE 3

The procedures of Example 2 were repeated at 0° C. as follows, with a lower isomerization rate resulting.

| | G. |
|---|---|
| 3-methylheptane | 3.59 |
| Mixed cis and trans 1,4-dimethylcyclohexane | 3.92 |
| Methylene chloride | 20.20 |
| $AlCl_3$ powder | 0.85 |

This mixture was saturated at 0° C. with dry hydrogen chloride and shaken at 0° C.:

TABLE 3

| Cumulative reaction time, minutes | 63 | 123 |
|---|---|---|
| Product composition, are percent:[1] | | |
| Isobutane | Trace | 0.04 |
| $C_5$ to $C_7$ paraffins | Trace | Trace |
| 2,4- and 2,5-dimethylhexanes | 1.0 | 1.6 |
| 2-, 3- and 4-methylheptanes | 44.3 | 43.0 |
| Low-boiling dimethylcyclohexanes[2] | 47.8 | 47.7 |
| High-boiling dimethylcyclohexanes[2] | 6.8 | 7.7 |
| Ethylcyclohexane | Trace | Trace |

[1] Concentration of methylene chloride factored out.
[2] CF. page 10- (b) and (c).

EXAMPLE 4

A suspension of 3.28 g. of $AlCl_3$ in a solution consisting of 1.00 g. of normal tetracosane ($C_{24}H_{50}$), 2.46 g. of methylcyclohexane and 4.26 g. of methylene chloride was saturated at 1 atmosphere and 27° C. with dry hydrogen chloride. The suspension was then shaken at 27° C. and sampled for analysis by GLPC at the intervals indicated in the table below after washing and drying. The aluminum chloride remained powdery and free of any complex throughout.

TABLE 4

| Cumulative reaction time, minutes | 56 | 162 | 240 |
|---|---|---|---|
| Product composition, area percent [1]: | | | |
| Isobutane | Trace | Trace | (²) |
| Isopentane | Trace | Trace | (²) |
| Cracked paraffin ($C_6$-$C_{23}$) | | Trace | (²) |
| Tetramethyl $C_{24}H_{50}$ | 0.3 | 2.1 | 4.4 |
| Trimethyl $C_{24}H_{50}$ | 7.7 | 30.9 | 40.2 |
| Mono- and dimethyl $C_{24}H_{50}$ | 11.2 | 16.1 | 14.9 |
| Normal $C_{24}H_{50}$ | 80.8 | 50.9 | 40.5 |

[1] Concentration of methylene chloride factored out.
[2] Considerable.

EXAMPLE 5

To a solution consisting of:

| | G. |
|---|---|
| N-tetraconsane | 1.0 |
| Methylcyclohexane | 10.08 |
| Methylene chloride | 13.55 | was added 3.32 g. of $AlCl_3$ powder and the suspension saturated with hydrogen chloride at one atmosphere and 0° C. The suspension was shaken at 28° C. for the intervals mentioned in the table below and the course of reaction was followed by sampling and analysis by GLPC. The aluminum chloride showed a slight tendency to agglomerate towards the end of the second reaction interval. The analyses given in the table include only the hydrocarbons having the molecular weight $C_{24}H_{50}$.

TABLE 5

| Cumulative reaction time, minutes | 200 | 306 |
|---|---|---|
| Product composition, area percent: | | |
| Tetramethyl $C_{24}H_{50}$ | 1.2 | 4.2 |
| Trimethyl $C_{24}H_{50}$ | 31.6 | 42.7 |
| Mono- and dimethyl $C_{24}H_{50}$ | 17.8 | 15.4 |
| Normal $C_{24}H_{50}$ | 49.4 | 37.8 |

As compared with the results of Example 4, it will be seen that no particular advantage is obtained by using large amounts of cracking suppressor.

EXAMPLE 6

To a solution consisting of:

| | G. |
|---|---|
| n-$C_{24}H_{50}$ | 0.96 |
| Methylcyclopentane | 10.0 |
| Methylene chloride | 13.8 | was added 3.30 g. of powdered $AlCl_3$ and the suspension was saturated at 0° C. and atmospheric pressure with dry hydrogen chloride. The suspension was then shaken at 28° C. and sampled at the intervals given in the table below for analysis by GLPC after washing and drying. Methylene chloride concentrations have been factored out of the product distributions. The contents of cyclohexane and methylcyclopentane in the samples add up to 100 percent and are not in the same concentration units as those given for molecules of molecular weight $C_{24}H_{50}$.

TABLE 6

| Cumulative reaction time, minutes | 200 | 363 | 563 | 803 | 923 | 1,043 | 1,163 | 1,236 |
|---|---|---|---|---|---|---|---|---|
| Product composition: | | | | | | | | |
| Isobutane | | | | | | Trace | Trace | Trace |
| Isopentane | | | | | | Trace | Trace | Trace |
| Cracked products | | | | | | Trace | Trace | Trace |
| Methylcyclopentane | 84.2 | 78.4 | 66.6 | 58.6 | 53.8 | 47.2 | 38.8 | 30.9 |
| Cyclohexane | 15.8 | 21.6 | 33.4 | 41.4 | 46.2 | 52.8 | 61.2 | 69.1 |
| Tetramethyl $C_{24}H_{50}$ | | | 0.6 | 1.3 | 1.3 | 2.5 | 4.0 | 5.4 |
| Trimethyl $C_{24}H_{50}$ | 7.5 | 11.2 | 18.4 | 29.3 | 33.3 | 40.1 | 50.3 | 57.7 |
| Mono- and dimethyl $C_{24}H_{50}$ | 12.3 | 17.1 | 21.5 | 22.9 | 23.7 | 22.3 | 20.1 | 17.7 |
| Normal $C_{24}H_{50}$ | 80.3 | 71.7 | 59.5 | 46.5 | 41.7 | 34.1 | 25.5 | 19.1 |

EXAMPLE 7

To a solution of 92 g. of wax[1], 214.5 g. of methyl cyclohexane and 276.0 g. of methylene chloride was added 121.8 g. of aluminum chloride powder and the suspension was saturated at atmospheric pressure at 26° C. with dry hydrogen chloride. The reaction mixture was then stirred at 26° C. for two hours and sampled (Cut 1). The reaction was continued for an additional 80 minutes and at this point the entire reaction mixture was filtered from the still powdery, free flowing aluminum chloride. The filtrate (Cut 2) was stripped of methylene chloride by heating on the steam bath and this caused approximately 2 ml. of a heavy liquid complex to separate from the remaining hydrocarbon phase. Separation of the two phases by decantation was easily accomplished and the hydrocarbon phase, after washing with water and aqueous sodium hydroxide was colorless. Cut 1 was worked up in essentially the same manner.

Analysis of the washed and dried products by GLPC showed that considerable isomerization had taken place as evidenced by the formation in the chromotogram of an "envelope" from which unisomerized wax emerged as a series of sharp spikes. The original wax (comprising a mixture of normal paraffins having from 21 to 33 carbon atoms) had an "envelope" which was practically negligible. In Cut 1 envelope material (branched paraffins having between two and three methyl groups per molecule) comprised 47.9 weight percent and normal paraffins 52.1 percent of the material in the molecular weight range of the original wax. Cut 2 consisted of 64.9 weight percent of oil and 35.1 percent of normal paraffins.

---
[1] See the following table:
The wax starting material was characterized as follows:

| | |
|---|---|
| Melting point, °F | 131.6 |
| Congesting point, °F | 131.0 |
| Refractive index at 212° F | 1.42 |
| WCI | 18 |
| Molecular weight | 364 |

EXAMPLE 8

2.5 kilograms of a blend consisting of 25 weight percent of wax[1], 22 percent of methylcyclohexane and 53 percent of methylene chloride, along with 150 g. of powdered aluminum chloride, was saturated with hydrogen chloride at ambient temperature and pressure and sealed in an ordinary, one-gallon, glass jug. The jug was then rotated slowly on a ball-mill rolling machine at room temperature for about three hours, following which the reaction mixture was worked up by decanting the liquid from the still-powdery aluminum chloride and stripping the solvent from the high-boiling product. A small amount of aluminum chloride complex, formed as the result of incipient cracking of the wax, remained dissolved in the methylene chloride-rich decanted liquid, but it precipitated on stripping the solvent and was removed from the hydrocarbon product bottoms by decantation. Conventionaly dewaxing separated the product into wax and 0° F. pour-point oil containing a minor amount of cracked material, the latter easily separable by vacuum distillation. Contamination in the dewaxing solvents introduced coloration into the oil, but this wax completely removed by subsequent percolation through clay. Yields were 52.5 percent recovered wax, 40.0 percent oil and 6.7 percent cracked material. The cracked material was largely a mixture of $C_9$–$C_{20}$ isoparaffins.

The properties and quality of oil from the isomerization were as follows:

(a) Infrared analysis disclosed that the 0° F. pour-point oil produced by the isomerization had, on the average, three branches more than the starting material. Inspection data on this oil in Table 7 disclose its very high viscosity index.

(b) The material was vacuum-distilled into three overhead fractions and a bottoms and the data in Table 8 show all the fractions to be of high viscosity index.

(c) The inhibited oxidation stability of the oil from wax isomerization is shown in Table 9.

TABLE 7.—PROPERTIES OF OIL FROM ISOMERIZATION OF HIGH MOLECULAR WT. WAX (A)

| | |
|---|---|
| SUS at 100° F. | 79.2 |
| SUS at 210° F. | 38.5 |
| KV at 100° F. | 15.46 |
| KV at 210° F. | 3.70 |
| VI D–2270 | 141.00 |
| VI (D–567) | 147.00 |
| Methylene/methyl groups | 2.67 |
| Pour point | —5° F |

(B) Boiling point range (micro distillation)

| | | |
|---|---|---|
| Initial—632° F. | 40%—760° F. | 90%—863° F. |
| 5%—669° F. | 50%—774° F. | 95%—891° F. |
| 10%—691° F. | 60%—790° F. | Stopped—907° F. |
| 20%—726° F. | 70%—808° F. | Recovery—97% |
| 30%—745° F. | 80%—830° F. | |

TABLE 8

| Boiling range: | | | | |
|---|---|---|---|---|
| Temperature, °C | 175-195 | 215 | 235 | Residue |
| Pressure, mm. Hg | 0.33 | 0.33 | 0.36 | |
| Viscosity data: | | | | |
| KV210 | 2.85 | 3.54 | 4.51 | 6.99 |
| KV100 | 10.57 | 14.47 | 20.95 | 40.26 |
| VI, D2270₃ | 133 | 134 | 143 | 146 |
| VI, VTF | 126 | 127 | 125.5 | 125 |
| Pour Point, °F | +5 | +10 | +10 | +15 |
| Mol. weight | 342 | 383 | 420 | 502 |

TABLE 9.—LUBRICATING OIL MADE BY ISOMERIZING HIGH MOLECULAR WEIGHT WAX

| Description, base oil | Method | Wax isomerized oil |
|---|---|---|
| Viscosity, SUS/100° F | D2161 | 79.2 |
| Viscosity, SUS/210° F | D2161 | 38.5 |
| Viscosity Index | D567 | 146 |
| Viscosity Index | D2270 | 144 |
| Pour | D97 | —5 |
| Color | D1500 | 0 |
| Inhibited Oil ([1]): | | |
| Continental Oxidation, hr | J-89 | 240 |
| Rotary Bomb Oxidation, min | D2112 | [2]295 |

[1] Inhibited with 0.6 wt. percent DBPC (Di-tert butyl para-cresol), 0.3 wt. percent Lubrizol 808 (a succinamide-type corrosion inhibitor made by Lubrizol Corp., Cleveland, Ohio), and 0.01 wt. percent Sun Defoamer D (a naphthenic-oil base with 1 percent methylphenylsiloxane as a defoamer).
[2] No sludge ---
[1] The wax starting material had a melting point of 127.1° F., a molecular weight of 363, a WCI of 56, and a refractive index (at 212° F.) of 1.4218.

EXAMPLES 9 AND 10

Two additional runs were made in accordance with the process of this invention wherein total slack wax and cerols obtained from a heavy distillate slack wax fraction, respectively, were employed as the charge materials. The reaction conditions and results obtained are reported in Table 10 below.

TABLE 10

| | | Charge Composition | | | | | Conditions | | Recovery | | |
|---|---|---|---|---|---|---|---|---|---|---|---|
| Example | Charge | Wax, g. | Ch₂Cl₂, g. | MCH*, g. | AlCl₃, g. | HCl P (atmos.) | T., °C. | Time, min. | AlCl₃, g. | Complex, g. | Hydrocarbon, g. |
| 9 | Total slack wax | 54.0 | 361 | 125 | 7.3 | 1.0 | 27 | 45 | | 11.90 | 51.9 |
| | Control | | | | | | | | | | |
| 10 | Cerols | 50.0 | 334 | 116 | 6.8 | 1.0 | 27 | 50 | 0 | 9.4 | 49.7 |
| | Control | | | | | | | | | | |

TABLE 11

| | Yields (normalized) | | Properties | | | | | | | |
|---|---|---|---|---|---|---|---|---|---|---|
| | | | Dewaxed Oil | | | | | Wax penetrations | | |
| Charge | Wt. wax | Percent oil | Pour point, °F. | KV, 210 | KV, 100 | VI, ASTM | VI, VTF | 77° F. | 90° F. | 100° F. |
| Example: | | | | | | | | | | |
| 9 Total slack wax | 44.7 | 55.3 | +20 | 3.70 | | 134 | 123 | | | |
| Control | 79.6 | 20.4 | +25 | 3.48 | | 130 | 122 | | | |
| 10 Cerols | 13.8 | 86.2 | −20 | 2.78 | | 107 | 110 | | | |
| Control | 35.6 | 64.4 | −5 | 5.27 | | 111 | 101 | | | |

EXAMPLE 11

The following example was carried out to illustrate the lack of an inert halogenated hydrocarbon solvent on the course of the reaction:

Into a stirred, high-pressure autoclave at ambient temperature were sealed 400 g. of a 10 weight percent solution of paraffin wax in methylcyclohexane, 100 g. of powdered aluminum chloride, 50 p.s.i. of dry hydrogen chloride and 250 p.s.i. of hydrogen. The autoclave was heated to 50 to 51° C. and stirred for a period of 350 minutes. No significant consumption of hydrogen was observed and on cooling to ambient temperature, venting and opening the reactor, the aluminum chloride powder appeared to be completely unchanged. The solution of wax was filtered from the aluminum chloride, washed, dried and analyzed by GLPC. The recovered wax showed no significant change over that charged to the reaction.

After repeated washing with methylcyclohexane, the aluminum chloride recovered from the reaction was carefully hydrolyzed by adding it in small portions to an excess of ice. Only a small amount of a viscous, oily material (less than 2 g.) was recovered from the clear, colorless solution of AlCl₃ in water. Apparently the recovered oily material was complex derived from cracking of wax. This appears to coat the granules of AlCl₃ and prevents any further reaction of the wax.

EXAMPLE 12

The following example was carried out to illustrate the effect on wax isomerization of an aluminum chloride catalyst complexed with a heavy alkylate which contained largely branched paraffins which boil at above about 400° F.:

AlCl₃ complex was prepared from 25 g. of AlCl₃ by suspending the halide in 50 ml. of heavy alkylate and passing dry HCl through the suspension at 75 to 80° C. This caused a rather vigorous cracking of the alkylate as was evidenced by an evolution of bubbles of gas from the surface of the AlCl₃ as the latter gradually liquified forming a light brown, relatively viscous oil with a supernatural layer of hydrocarbon. Passage of CHl was discontinued when approximately ⅕ of the AlCl₃ remained unliquified. The hydrocarbon was separated from complex by decantation and the latter was sealed in a 75 ml. bomb along with 25 g. of a 10 weight percent solution of a paraffinic wax in methylcyclohexane. To activate the catalyst, 100 microliters of 2,2,5-trimethylhexane was added to the bomb after which the latter was pressured with 36 p.s.i. of dry HCl and 225 p.s.i. of hydrogen.

The bomb was then shaken vigorously at 18.5° C. for one hour after which a small portion of the hydrocarbon phase was removed, washed with water, dried and analyzed by GLPC (Cut 1).

The bomb was vented to atmospheric pressure and 50 microliters of 2,2,5-trimethylhexane added, after which 50 p.s.i. of dry hydrogen chloride and 100 p.s.i. of hydrogen were sealed into the bomb. The latter was shaken at 40° C. for 139 minutes and the hydrocarbon phase sampled as above (Cut 2).

This procedure was repeated another two times at 40 to 41° C. for 158 minutes and 122 minutes yielding Cuts 3 and 4, respectively.

Analysis by GLPC gave the ratios of areas of envelope material (essentially all 0° C. pour point, high viscosity index oil) to total hydrocarbon in the original molecular weight range of the wax:

Original Wax at 5 area percent.
Cut 1 at 4.4 area percent.
Cut 2 at 25.2 area percent.
Cut 3 at 28.5 area percent.
Cut 4 at 32.2 area percent.

It will be seen from the foregoing that despite high temperature and pressure conditions over a long period of time, the results were characterized by relatively low conversion rates and a high degree of cracking.

What is claimed is:

1. A process for isomerizing paraffins having at least eight carbon atoms which comprises contacting said paraffins with aluminum chloride at a temperature of from about 0° to 50° C. in the presence of an inert halogenated hydrocarbon solvent and hydrogen chloride, and in the substantial absence of compounds which form complexes with the aluminum chloride, under reaction conditions which limit the weight percent conversion per pass of the paraffin charge stock to an amount which avoids cracking of said paraffins.

2. The process according to claim 1 wherein the paraffin charge stock comprises paraffins having from 8 to 12 carbon atoms, and the weight percent conversion per pass of said charge stock is limited to not more than about 25 percent.

3. The process according to claim 1 wherein the paraffin charge stock comprises paraffins having from 13 to 18 carbon atoms, and the weight percent conversion per pass of said charge stock is limited to not more than about 45 percent.

4. The process according to claim 1 wherein the paraffin charge stock comprises paraffins having from 19 to 100 carbon atoms, and the weight percent conversion per pass of said charge stock is limited to not more than about 65 percent.

5. The process according to claim 1 wherein the paraffin is a paraffin wax, slack wax or wax filtrate, or mixtures thereof, said paraffin having from 17 to 100 carbon atoms.

6. The process according to claim 1 wherein the inert halogenated hydrocarbon solvent is methylene chloride or sym.-tetrachloroethane.

7. The process according to any one of claims 1 to 6 wherein the reaction is carried out in the added presence of a cracking inhibitor.

8. The process according to claim 7 wherein the cracking inhibitor is methylcyclohexane.

References Cited

UNITED STATES PATENTS

| | | | |
|---|---|---|---|
| 2,361,452 | 10/1944 | Brown | 260—683.76 |
| 2,427,775 | 9/1947 | Friedman | 260—683.76 |
| 2,468,746 | 5/1949 | Greensfelder et al. | 260—683.76 |
| 2,475,358 | 7/1949 | Moore et al. | 260—683.76 |
| 2,849,428 | 8/1958 | Small et al. | 260—683.76 |
| 2,965,694 | 12/1960 | Stanley et al. | 260—683.76 |
| 2,410,024 | 10/1946 | Fawcett et al. | 260—683.76 |

HERBERT LEVINE, Primary Examiner

U.S. Cl. X.R.

260—683.75, 683.76